(No Model.)

T. SCHEEN.
LAWN SPRINKLER.

No. 502,641. Patented Aug. 1, 1893.

Witnesses,

Inventor,
Thomas Scheen
By Dewey & Co.
Attys

UNITED STATES PATENT OFFICE.

THOMAS SCHEEN, OF OAKLAND, CALIFORNIA.

LAWN-SPRINKLER.

SPECIFICATION forming part of Letters Patent No. 502,641, dated August 1, 1893.

Application filed August 15, 1892. Serial No. 443,130. (No model.)

*To all whom it may concern:*

Be it known that I, THOMAS SCHEEN, a citizen of Norway, residing in Oakland, county of Alameda, State of California, have invented an Improvement in Lawn-Sprinklers; and I hereby declare the following to be a full, clear, and exact description of the same.

My invention relates to certain improvements in lawn sprinklers.

It consists in certain details of construction which will be more fully explained by reference to the accompanying drawings, in which—

Figure 1:
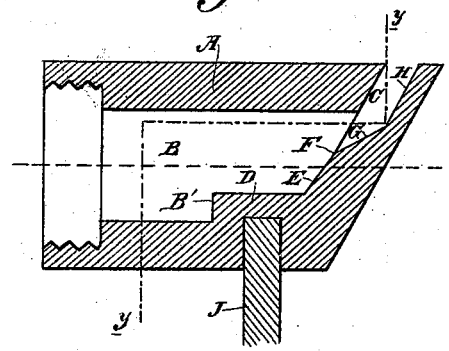
Figure 2:
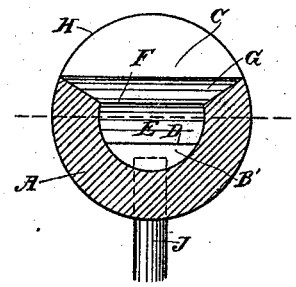

Figure 1 is a longitudinal, vertical section of the head of the sprinkler. Fig. 2 is a transverse section on the line $y$—$y$ Fig. 1.

In a former patent, No. 436,942, issued to me September 23, 1890, I have shown a sprinkler having a peculiarly formed slot extending outwardly from the central opening of the sprinkler, and my present invention is an improvement upon the former device.

A is the head of the sprinkler having an inclined closed head at the outer end, and a central opening B made in the opposite end, and screw-threads whereby it is attached to a hose or other device for supplying water. The opening B has its upper side continued and meeting at an obtuse angle with the inner side C of the discharge opening. The lower part of the opening B is interrupted by a shoulder B' from which the side D extends parallel with the upper side of the opening to the foot of the incline E which meets the line D at an obtuse angle, and extends upwardly to the point F where it meets the second incline G at an obtuse angle and at a point above the center line of the opening B. From the outer end of the line G, the side H forming the outer side of the discharge opening, extends upwardly and outwardly approximately parallel with the side C which forms the inner side. The present description of these lines refers to the longitudinal vertical section in which the section being made centrally through the passages, the upper and lower and front and back sides of these passages are represented by the lines referred to.

The section, Fig. 2, taken through the line X—X of Fig. 1, illustrates the position of the discharge passage and shows that its lower edge commences above the horizontal center line drawn through the opening B. The upper end of the discharge passage diverges as shown in the drawings, and forms upon the exterior of the discharge head a segment of a circle less than a semi-circle. By reason of the shape of this passage and the diverging sides intersecting the central passage in a plane above the central line of said passage, the spray or sheet of water which is delivered from the discharge opening, is made more even and regular throughout its whole arc, whereas if the points of intersection are at or below the plane of the center there is a tendency of the water to pass out in a heavy body at the lower edges, while the central portion of the discharge slot does not deliver the water in equal force and quantity. As the spray or sheet of water which is delivered from this discharge opening is in the form of a narrow sheet, it is especially applicable to the irrigation of narrow borders where it is undesirable to throw a large quantity of water upon paths or other points which it is not designed to irrigate. In order to effect this, the head A is screwed upon the hose, and has a pin J projecting from one side of it.

Having thus described my invention, what I claim as new, and desire to secure by Letters Patent, is—

1. In a lawn sprinkler, a cylindrical head having a central opening extending axially into it from one end, and the opposite end closed and forming a flat inclined surface, an inclined segmental slot made through the side of the head, essentially parallel with the end thereof and intersecting the central opening in convergent lines which meet said opening in a plane above the axis thereof substantially as herein described.

2. In a lawn sprinkler, a cylindrical head having a central opening extending into it axially from one end, and the opposite end closed and forming a flat inclined surface, an inclined segmental slot made through the side of the head approximately parallel therewith and converging from the sides toward the central opening which it intersects above its axis, the rear faces E, G and H of the central and discharge opening intersecting each other at obtuse angles, substantially as herein described.

In witness whereof I have hereunto set my hand.

THOMAS SCHEEN.

Witnesses:
BENJ. W. FERRIS,
GEO. DE JORLEY.